(12) United States Patent
Krombholz et al.

(10) Patent No.: US 7,118,213 B2
(45) Date of Patent: Oct. 10, 2006

(54) PROMOTIONAL AID

(75) Inventors: Todd R. Krombholz, Jacksonville, FL (US); Dharmesh Dubey, Jacksonville, FL (US); Terrell W. Carothers, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 10/858,218

(22) Filed: Jun. 1, 2004

(65) Prior Publication Data

US 2005/0275800 A1 Dec. 15, 2005

(51) Int. Cl.
*G02C 7/02* (2006.01)

(52) U.S. Cl. .................. 351/159; 351/160 R; 206/730

(58) Field of Classification Search ............ 351/160 R, 351/160 H
See application file for complete search history.

(56) References Cited

U.S. PATENT DOCUMENTS

| | | | | |
|---|---|---|---|---|
| 4,128,318 A | * | 12/1978 | Sieglaff et al. ......... | 351/160 R |
| 4,814,402 A | * | 3/1989 | Nakashima et al. ........ | 526/245 |
| 4,909,896 A | * | 3/1990 | Ikushima et al. ............. | 216/26 |
| 5,302,672 A | * | 4/1994 | Ogura et al. ................. | 525/481 |
| 5,789,462 A | * | 8/1998 | Motani et al. .............. | 523/106 |
| 6,691,872 B1 | * | 2/2004 | Berman et al. ............. | 206/484 |
| 6,761,452 B1 | | 7/2004 | Moravec et al. | |
| 6,872,446 B1 | * | 3/2005 | Murschall et al. ....... | 428/304.4 |
| 2004/0176977 A1 | | 9/2004 | Broderick | |

FOREIGN PATENT DOCUMENTS

| | | |
|---|---|---|
| EP | 0765741 | 4/1997 |
| EP | 1125849 | 8/2001 |
| WO | WO 98/32587 | 7/1998 |

OTHER PUBLICATIONS

PCT International Search Report, dated Jan. 12, 2005, for PCT Int'l. Appln. No. PCT/US2005/019124.

* cited by examiner

*Primary Examiner*—Jordan M. Schwartz

(57) ABSTRACT

The present invention relates to a promotional aid comprising a substantially flat plastic film sample which comprises at least one quality which is substantially similar to at least one quality of a medical device. The promotional aids of the present invention may be sent directly to consumers.

13 Claims, 1 Drawing Sheet

PROMOTIONAL AID

FIELD OF THE INVENTION

This invention relates to promotional aids for plastic articles that must be dispensed with a prescription and more particularly, contact lenses.

BACKGROUND OF THE INVENTION

Many medical devices can be dispensed only with a prescription. For medical devices such as contact lenses, this means that consumers who are potentially interested in contact lenses can only get lenses from a licensed eye care practitioner.

In the past few years many new contact lens products have been introduced, including materials with unique properties, such as higher oxygen permeability and improved lubricity. The "feel" or tactile qualities are particularly difficult to convey to consumers without samples. In the past contact lens manufacturers have sponsored booths where consumers can handle (but not put on their eyes) contact lenses. However, these booths must be staffed by a licensed optometrist, and care must be taken to insure that consumers do not take any of the lenses they have handled. Accordingly there remains a need for a promotional aid for medical devices which can provided to directly to consumers.

SUMMARY OF THE INVENTION

The present invention relates to a promotional aid for medical devices which can be provided directly to consumers. More specifically the present invention relates to a promotional aid comprising a substantially flat plastic film sample, which comprises tactile qualities which are substantially similar to the tactile qualities of a medical device, and in one embodiment an ophthalmic device, such as a contact lens.

DETAILED DESCRIPTION OF THE INVENTION

Figure 1:
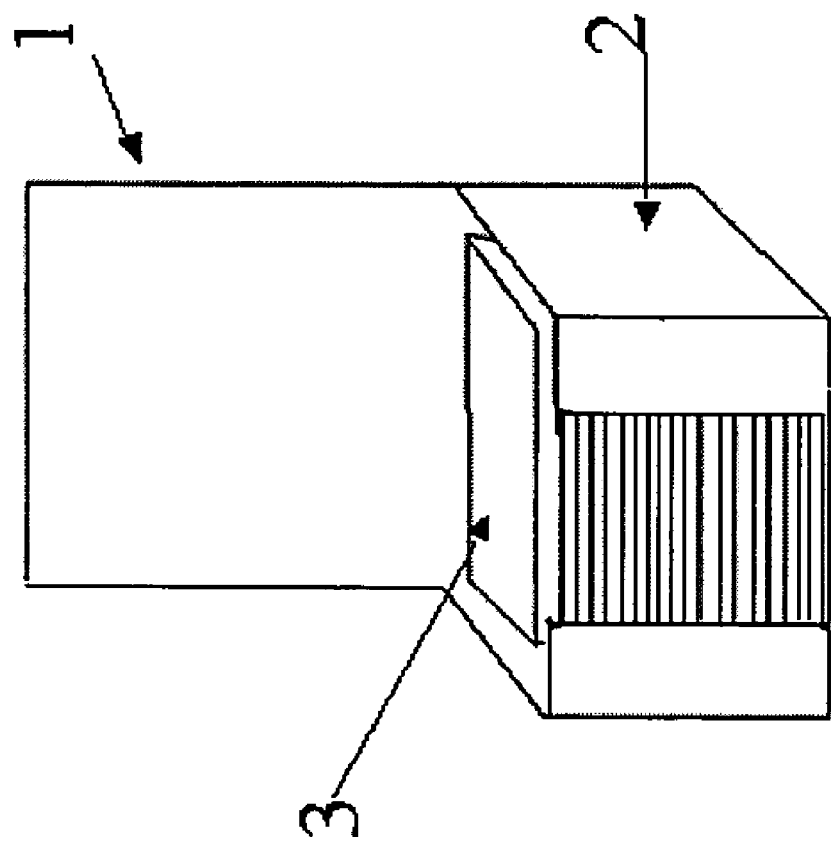
FIG. 1 is a drawing of a purchase display.

The promotional aid of the present invention will now be described in detail. The promotional aid will be described with respect to a contact lens. However, it should be appreciated by those of skill in the art, that the present invention may be applied to other medical devices, such as transdermal patches, implants, catheters, endoscopes, condoms, and the like.

Ophthalmic devices, and particularly contact lenses are handled frequently by potential users. As such many users have formed opinions of contact lenses based only upon the lenses they have worn. However, new contact lens materials, with greatly improved properties such as lubricity, softness, flexibility, suppleness and/or water retention are being introduced. The present invention provides a vehicle for consumers to feel these new lens materials, or samples which have properties similar to the new lens materials without having to see an optometrist or ophthalmologist. The present invention also provides a way for contact lens manufacturers to send samples of lens material, in sheet or film form directly to consumers, so that consumers may feel the lens materials without having to acquire a contact lens. The present invention further provides a vehicle for a manufacturer to physically convey a particular product attribute to consumers.

As used herein, the terms "lens" and "ophthalmic device" refer to devices that reside in or on the eye. These devices can provide optical correction, wound care, drug delivery, diagnostic functionality, cosmetic enhancement or effect or a combination of these properties. The term lens includes but is not limited to soft contact lenses, hard contact lenses, intraocular lenses, overlay lenses, ocular inserts, and optical inserts.

The promotional aids of the present invention are small samples, or swatches of substantially flat polymeric materials having tactile properties which are substantially similar to those of a contact lens material. The size of the swatch is not critical, so long as the sample is big enough to be conveniently held and handled by a consumer. Preferably the swatch is at least as big as a contact lens. More preferably the area of the swatch is between about 100 mm$^2$ (for example 10 mm×10 mm) and 20,000 mm$^2$. More preferably still, the area of the swatch is between about 100 mm$^2$ and about 6,000 mm$^2$. Generally the swatch has a thickness which is similar to the ophthalmic device. When the ophthalmic device which is being promoted is a contact lens the swatch thickness is between about 70 and about 200 microns.

The swatch may have any geometric configuration. Common configurations include, but are not limited to square, rectangular, ovoid, circular, triangular and the like. In a preferred embodiment the swatch comprises no sharp edges. Alternatively, the swatches may be cut into fanciful shapes, such as a logo, the outline of a word, or object.

Since the swatches of the present invention will be sent directly to consumers, it is important that their shape and configuration be readily distinguishable from a contact lens. Accordingly the swatches of the present invention are generally in film or sheet form and are substantially flat. As used herein, substantially flat means not spherically curved or bowl shaped. A spherical curve, is a curve of at least about 30° from level. The swatches of the present invention may curl or curve in a single direction, but not in all directions. Preferably the swatches of the present invention display less than about 20°, preferably less than about 10°, more preferably between about 0 and about 5° curl from level.

Swatches of the present invention may be made from a variety of polymers, so long as the tactile qualities are substantially the same as the contact lens material or property which is being promoted. Swatches may be made of (a) the same material as the lens that is being promoted, (b) a polymer having the same or similar components, or (c) an entirely different polymer. For example, if the contact lens being promoted was Acuvue® Advance™ brand contact lenses with Hydraclear™ (commercially available from Johnson & Johnson Vision Care, Inc.), the swatch could be made from galyfilcon A (the polymer from which Acuvue® Advance™ lenses are made), (b) a similar silicone hydrogel, or (c) an entirely different polymer which is made to similar tactile properties to those which are being promoted. Any elastomeric material may be used such as polyurethanes, polysiloxanes, silicones, polybutadienes, polyisoprenes, polyamides, polyolefins, acrylates, polysaccharides, chlorinated polyethylenes such as Tyrin, polychloroprenes such as neoprene, chlorosulfonated PEs such as Hypalon, fluoroelastomers such as Viton, polyisoprene, polyisobutylene, olefinic thermoplastic elastomers, polyether block amide, polybutadiene thermoplastic elastomers, bromobutyl rubbers epichlorohydrin rubber, nitrile rubbers and polysulfide rubbers, copolymers and mixtures thereof and the like. Suitable examples of some of these include, but are not limited to hydrogels formed from polyurethanes, which may include siloxanes and silicones; acrylates, methacrylates; N-vinyl lactams; N-vinyl amides; polyethers such as poly-ethyleneglycol, polypropylene glycol or polytetraethyleneglycol; polyesters such as polylactones, and isocyanates such as tolylene diisocyanate, methylenebis(phenyl isocyanate) and isophorone diisocyanate.

Specific examples include, but are not limited to thermoplastic polyurethanes such as Elasthane or Pellethane (commercially available from Dow Chemical Co.), polyester copolymers, such as Elastin (commercially available from Goodyear).

As used herein "tactile properties" include, but are not limited to lubricity, which may be expressed as a coefficient of friction and modulus. In the embodiment where the contact lenses being promoted are Acuvue® Advance™ brand contact lenses, the swatch would have a modulus of between about 40 and 100 psi, and preferably between about 60 and about 80 psi and a coefficient of friction of less than about 0.01. The swatch is also visually clear and preferably has a haze value less than about 30%, as compared to a CSI lens. The swatch may contain visibility tints, or colorants to provide the swatch with the same or substantially the same visual characteristics as the contact lenses being promoted.

In one embodiment the swatch is a vehicle to convey a single property of a new ophthalmic device. Examples of single properties include, but are not limited to tactile properties such as lubricity or stiffness, visual properties such as color, color patterns or photochromicitiy. Alternatively, multiple properties may be conveyed.

As used herein, substantially the same means subjectively indistinguishable when handled by consumers. The level of difference which can be distinguished by digital manipulation will vary based upon the property.

The swatches of the present invention may be made via numerous methods which are generally known for making a sheet or film. Such methods include but are not limited to direct molding, injection molding, extrusion molding, compression molding, thermoforming, blow molding (including injection and extrusion blow molding), extrusion forming, calendaring, casting, vacuum forming, continuous web casting and the like. Conditions for each of the methods are well known in the art, and generally comprise introducing a reactive mixture of polymerizable components into a mold, through a die or onto or between a plate, sheet, web roll, and the like, and polymerizing the reactive mixture. Polymerization conditions and methods will depend upon the components used to make the reactive mixture. Generally, the polymerization may be conducted using conditions which are well known, such as free radical polymerization, condensation reactions, cationic and anionic polymerizations and include exposure to heat, light, (such as free radical vinyl polymerizations) acids (such as nylons, or cationic polymerizations which can use Lewis acids), bases (anionic polymerization of vinyl compound), and gases, such as oxygen. Known initiators, catalysts and chain transfer agents and conditions may be used. Once the film or sheet is formed it can be cut into the desired swatch shape. Suitable methods are known and include lathe or laser cutting, roll die cutting, stamping, and the like.

The films useful for making swatches may also be cast from thermoplastics, elastomers, thermoplastic elastomers, interpenetrating networks made from any of the foregoing, and the like using known methods such as those listed above.

Some desired properties for the swatch material include a water content of at least about 20%, preferably at least about 30%, substantially resistant to cracking, not sticky or tacky. For ease of manufacture, it may also be desirable for the material to be capable of being rolled and able to be peeled from a casting substrate in the dry state.

For example, in one embodiment, where the device being promoted is a soft contact lens, the swatch could be made from a hydrogel. Suitable hydrogels may be formed from at least one acrylic group containing monomer ($CH_2$=CROX, where R is hydrogen or $C_{1-6}$alkyl an X is O or N) or vinyl group containing monomer (—C=$CH_2$). Examples include N,N-dimethylacrylamide, 2-hydroxyethyl methacrylate, glyceral methacrylate, 2-hydroxyethyl methacrylamide, polyethyleneglycol monomethacrylate, methacrylic acid, acrylic acid, vinyl alcohol, N-vinyl pyrrolidone, N-vinyl-N-methyl acetamide, N-vinyl-N-ethyl acetamide, N-vinyl-N-ethyl formamide, N-vinyl formamide. Silicone containing monomers, prepolymers and macromers and hydrophilic polymers may also be included. In a specific, non-limiting embodiment the device is formed from a reactive mixture comprising 2-hydroxyethyl methacrylate, N,N-dimethylacrylamide and optionally, at least one silicone monomer, polyvinyl pyrrolidone, or mixtures thereof. The reactive components are mixed in a diluent with any other desired components, such as photoinitiators, tints, pigments and the like, to form a clear blend. The blend is then spread onto a substrate, for example, but not limited to a sheet, web or plate, cured, cut into the desired shape and removed from the substrate.

Examples of soft contact lenses formulations from which the swatch may be made include but are not limited to the formulations of etafilcon A, genfilcon A, lenefilcon A, polymacon, acquafilcon A, galyfilcon A, senofilcon A, vifilcon A, balafilcon A, and lotrafilcon A, lotrafilcon B and the like. The preferable contact lens formulations are etafilcon A, balafilcon A, acquafilcon A, lotrafilcon A, lotrafilcon B, galyfilcon, senofilcon and the like.

When the ophthalmic device to be promoted is a soft contact lens the swatch may also be hydrated to mimic the tactile properties of a soft contact lens. In the embodiment where a hydrated swatch is desired, the percent water in the swatch may similar to the contact lens being promoted, or may be different.

Further, the swatches of the present invention may contain additives. The additives may be the same as those used in the medical device, such as a wetting agent or a photochromic compound, or they may be different, but impart the swatch with properties which are similar to the medical device being promoted. So, when the swatch is used for promoting a contact lens having improved lubricity, such as Acuvue® Advance™ brand contact lenses with Hydraclear™, the swatch may additionally comprise poly(vinyl pyrrolidone) (PVP). Preferably the PVP is present in an amount sufficient to provide the swatch with tactile properties comparable to the contact lens. The amount will vary based upon the polymer selected for the swatch. Suitable amounts include up to about 75 weight %, and preferably between about 5 and 75 weight %, and more preferably between about 10 and about 60 weight %.

Alternatively other components may be added to the swatch polymer formulation to simulate the feel provided to the swatch by PVP. For example, other known wetting agents may be added to the formulation, may be coated onto the swatch or may be added to the water in which the swatch is hydrated. In addition, other agents, such as but not limited to surfactants, lubricants, blooming agents and the like which are known to impart a slippery feel to an article may also be used as a coating or a component of the hydrating or packing solution.

Ranges and options for other product attributes will be apparent to those of skill in the art using the teaching of the present invention.

In this embodiment, once the swatch is formed it is contacted with water. Any method which brings the swatch into contact with water may be used, such as soaking, dipping, spraying, brushing or wiping and the like.

In addition to the swatch, the present invention also relates to a pouch or packet in which the swatch may be stored. In embodiments where the swatch is hydrated the pouch should be waterproof. The pouch may be clear, translucent or opaque. The interior dimensions of the pouch are larger that the swatch, but beyond that, the pouch may have any dimensions. Any material may be used, so long as the material is capable of being sealed, and as stated above, is waterproof, when a hydrated swatch is used. Suitable pouch materials include mylar film, metal films, metal film laminates, plastics such as polyethylene or polypropylene, or laminates, such as wax or plastic lined paper and the like. Preferably the pouch materials are printable.

In one embodiment the swatch is made, and then placed into the pouch with water. In this embodiment the swatch becomes hydrated while in the pouch.

Optionally, the pouches may be sterilized or may include a bactericidal or bacteriastatic agent.

The pouches may be distributed to consumers in known ways. For example the swatch containing pouches could be stacked in a display device so that consumers could take a swatch containing pouch from the display. Such displays are well known in the retail industry, and include point of purchase displays, such as generally depicted in FIG. 1. The display includes a visual display 1 and a sample dispenser 2, which is stocked with swatch pouches, 3. The visual display includes information about the product being promoted, and may be nearly any size, depending upon the type of the display. Common visual display sizes are those made to fit on a desk or table top, end of aisle or booth display.

Swatch pouches may also be distributed directly to consumers. For example, the pouches may be affixed to a magazine insert or may be attached to a post card or letter and mass mailed directly to consumers. The insert or post card may contain advertising relating to the contact lens, promotional information or offers, medical information, disclaimers, combinations thereof and the like. The insert or postcard may also provide a return post card to the manufacturer, instructing the manufacture to send further product information or to direct the consumer to an eye care professional who could prescribe lenses for the consumer.

Haze is measured by placing a hydrated test film in borate buffered saline in a clear 20×40×10 mm glass cell at ambient temperature above a flat black background, illuminating from below with a fiber optic lamp (Titan Tool Supply Co. fiber optic light with 0.5" diameter light guide set at a power setting of 4–5.4) at an angle 66° normal to the sample cell, and capturing an image of the sample from above, normal to the sample cell with a video camera (DVC 1300C:19130 RGB camera with Navitar TV Zoom 7000 zoom lens) placed 14 mm above the sample platform. The background scatter is subtracted from the scatter of the sample by subtracting an image of a blank cell using EPIX XCAP V 1.0 software. The subtracted scattered light image is quantitatively analyzed, by integrating over the central 10 mm of the sample, and then comparing to a −1.00 diopter CSI Thin Lens®, which is arbitrarily set at a haze value of 100, with no sample set as a haze value of 0. Five samples are analyzed and the results are averaged to generate a haze value as a percentage of the standard CSI lens.

The dynamic coefficient of friction of a contact lens was measured using a Micro-Tribometer, Model UMT-2 unit, with a pin-on-disk sample mount. The contact lens sample was removed from its packing solution and placed on the tip of the "pin" with the center of the lens on the pin tip and pressed against a highly polished stainless steel disk moving at a constant speed of either 10 or 15 cm/sec. Loads of 3,5,10 and 20 g were used. The duration at each load was 25 seconds and all measurements were taken at ambient temperature. The resistant frictional force was measured and was used to calculate the coefficient of friction using the following formula: $\mu=(F-f')/N$, where $\mu$=coefficient of friction
F=measured frictional force, f+f'
f=actual frictional force
f'=experimental artifacts due lens deformation, such as dehydration and interfacial surface tension forces, elasticity, etc.
N=normal load Seven lenses were tested for each lens type. The coefficient of friction was averaged and reported. The dynamic coefficient of friction of the film samples may be measured using the above procedure or a similar procedure suitable for flat film samples.

In order to illustrate the invention the following examples are included. These examples do not limit the invention. They are meant only to suggest a method of practicing the invention. Those knowledgeable in contact lenses as well as other specialties may find other methods of practicing the invention. However, those methods are deemed to be within the scope of this invention.

The following abbreviations are used in the examples below:
SIGMA 2-propenoic acid, 2-methyl-, 2-hydroxy-3-[3-[1, 3,3,3-tetramethyl-1-[(trimethylsilyl)oxy]disiloxanyl]propoxy]propyl ester
DMA N,N-dimethylacrylamide
HEMA 2-hydroxyethyl methacrylate
mPDMS 800–1000 MW ($M_n$) monomethacryloxypropyl terminated mono-n-butyl terminated polydimethylsiloxane
CG 1819 bis(2,4,6-trimethylbenzoyl)-phenylphosphineoxide
PVP poly(N-vinyl pyrrolidone) (K value 90)
Glucamate DOE-120 Poly(oxy-1,2-ethanediyl),.alpha.-hydro-.omega.-hydroxy-, ether with methyl D-glucopyranoside 2,6-di-9-octadecenoate (2:1), (Z,Z)-

EXAMPLE

The components shown in Table 1 were combined to make a clear solution. This viscous mixture was positioned in a nitrogen atmosphere between two glass plates separated by a gasket, and cured by irradiation with fluorescent light bulbs (Philips TL-03) for 20 minutes using an incident intensity of about 0.4 MW/cm². One of the glass plates was removed and the film was released by immersing it into a solution of 0.1% Glucamate™ DOE-120 surfactant in water at 95° for 5–10 minutes, followed by rinsing in deionized water, and then placing into borate buffered saline. These sheets were optically clear and elastic and they had lubricious surfaces. They can be cut into pieces of any desired size.

TABLE 1

| Component | Grams |
|---|---|
| SiGMA | 3.38 |
| mPDMS 1000 | 1.0 |
| PVP K-90 | 1.5 |
| DMA | 3.0 |
| HEMA | 1.0 |
| TEGDMA | 0.1 |
| CGI 819 | 0.25 |
| Isopropanol | 1.5 |

What is claimed is:

1. An article comprising a promotional aid which may be directly distributed to consumers to convey at least one tactile quality of a medical device to said consumers, said promotional aid comprising a visually clear, substantially flat plastic film sample which comprises at least one tactile quality which is substantially similar to at least one tactile quality of said medical device and further comprising a pouch in which said film sample is stored wherein said pouch is releasably affixed to a magazine insert, post card or letter.

2. The article of claim 1 wherein said film sample is free from sharp edges.

3. The article of claim 1 wherein said film sample has an area between about 100 $mm^2$ and 20,000 $mm^2$.

4. The article of claim 1 wherein said film sample has an area between about 100 $mm^2$ and about 6,000 $mm^2$.

5. The article of claim 1 wherein said film sample has a thickness similar to the medical device.

6. The article of claim 1 wherein said film sample has a thickness between about 50 and about 300 microns.

7. The article of claim 1 wherein said film sample is hydrated.

8. The article of claim 1 wherein said medical device is an ophthalmic device.

9. The article of claim 8 wherein said medical device is a contact lens.

10. The article of claim 1 wherein a multiplicity of said pouches are stocked in a display device.

11. The article of claim 1 wherein said medical device is supplied under a prescription and said promotional aid is sent directly to a consumer.

12. The article of claim 8 wherein said promotional aid has a haze value of less than about 30%.

13. The article of claim 9 wherein said promotional aid has a haze value of less than about 30%.

* * * * *